United States Patent
Mayfield et al.

(10) Patent No.: US 6,446,167 B1
(45) Date of Patent: Sep. 3, 2002

(54) CACHE PREFETCHING OF L2 AND L3

(75) Inventors: Michael John Mayfield; Francis Patrick O'Connell, both of Austin; David Scott Ray, Georgetown, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/435,861

(22) Filed: Nov. 8, 1999

(51) Int. Cl.[7] .................................................. G06F 9/38
(52) U.S. Cl. ........................ 711/122; 711/3; 711/118; 711/119; 711/133; 711/137; 711/144
(58) Field of Search ......................... 711/3, 118–123, 711/137, 133, 145, 144, 213; 712/207

(56) References Cited

U.S. PATENT DOCUMENTS

| | | | | |
|---|---|---|---|---|
| 5,664,147 A | * | 9/1997 | Mayfield | 711/122 |
| 5,740,399 A | * | 4/1998 | Mayfield et al. | 711/122 |
| 5,758,119 A | * | 5/1998 | Mayfield et al. | 711/122 |
| 5,809,529 A | * | 9/1998 | Mayfield | 711/122 |
| 6,085,291 A | * | 7/2000 | Hicks et al. | 711/122 |
| 6,131,145 A | * | 10/2000 | Matsubara et al. | 711/122 |
| 6,356,980 B1 | * | 3/2002 | Arimilli et al. | 711/122 |
| 6,356,982 B1 | * | 3/2002 | Arimilli et al. | 711/144 |
| 6,370,618 B1 | * | 4/2002 | Arimilli et al. | 711/122 |

* cited by examiner

*Primary Examiner*—Than Nguyen
(74) *Attorney, Agent, or Firm*—Kelly K. Kordzik; Winstead Sechrest & Minick P.C.; Anthony V.S. England

(57) ABSTRACT

A data processing system includes a processor having a first level cache and a prefetch engine. Coupled to the processor are a second level cache and a third level cache and a system memory. Prefetching of cache lines is performed into each of the first, second, and third level caches by the prefetch engine. Prefetch requests from the prefetch engine to the second and third level caches is performed over a private prefetch request bus, which is separate from the bus system that transfers data from the various cache levels to the processor. The prefetch request may include a signal notifying the third level cache to also prefetch.

18 Claims, 6 Drawing Sheets

L3:
- n + 8
- n + 9
- n + 10
- n + 11
} + 1 block

- n + 12
- n + 13
- n + 14
- n + 15
} + 2 block

L3:
- n + 8
- n + 9
- n + 10
- n + 11
} + 1 block

- n + 12
- n + 13
- n + 14
- n + 15
} + 2 block

+ 1 block

- n + 12
- n + 13
- n + 14
- n + 15

+ 2 block

+ 2 block

- n + 16
- n + 17
- n + 18
- n + 19

+ 3 block

| 31 | /// | TH | RA | RB | 278 | / |
|---|---|---|---|---|---|---|
| 0 | 6 | 9 | 11 | 16 | 21 | 31 |

CACHE PREFETCHING OF L2 AND L3

CROSS-REFERENCE TO RELATED APPLICATIONS

This application for patent is related to the following applications for patents filed concurrently herewith:

U.S. patent application Ser. No. 09/435,865, entitled "Software Hint Cache Prefetch"; and U.S. patent application Ser. No. 09/435,860, entitled "Hardware Prefetch Mechanism."

These applications for patent are hereby incorporated by reference herein as if fully set forth herein.

TECHNICAL FIELD

The present invention relates in general to data processing systems, and in particular, to a system and method for implementing prefetching of data with respect to a plurality of cache levels.

BACKGROUND INFORMATION

A special very high-speed memory is sometimes used to increase the speed of processing within a data processing system by making current programs and data available to a processor ("CPU") at a rapid rate. Such a high-speed memory is known as a cache and is sometimes employed in large computer systems to compensate for the speed differential between main memory access time and processor logic. Processor logic is usually faster than main memory access time with a result that processing speed is mostly limited by the speed of main memory. A technique used to compensate for the mismatch in operating speeds is to employ one or more extremely fast, small memory arrays between the CPU and main memory whose access time is close to processor logic propagation delays. It is used to store segments of programs currently being executed in the CPU and temporary data frequently needed in the present calculations. By making programs (instructions) and data available at a rapid rate, it is possible to increase the performance rate of the processor.

Analysis of a large number of programs has shown that the references to memory at any given interval of time tend to be confined within a few localized areas in memory. This phenomenon is known as the property of "locality of reference." The reason for this property may be understood considering that a typical computer program flows in a straight-line fashion with program loops and subroutine calls encountered frequently. When a program loop is executed, the CPU repeatedly refers to the set of instructions in memory that constitute the loop. Every time a given subroutine is called, its set of instructions are fetched from memory. Thus, loops and subroutines tend to localize the reference to memory for fetching instructions. To a lesser degree, memory references to data also tend to be localized. Table look-up procedures repeatedly refer to that portion in memory where the table is stored. Iterative procedures refer to common memory locations and arrays of numbers are confined within a local portion of memory. The result of all these observations is the locality of reference property, which states that, over a short interval of time, the addresses of instructions generated by a typical program refer to a few localized areas of memory repeatedly while the remainder of memory is accessed relatively infrequently.

If the active portions of the program and data are placed in a fast small memory such as a cache, the average memory access time can be reduced, thus reducing the total execution time of the program. The cache memory access time is less than the access time of main memory often by a factor of five to ten. The cache is the fastest component in the memory hierarchy and approaches the speed of CPU components.

The fundamental idea of cache organization is that by keeping the most frequently accessed instructions and data in one or more fast cache memory arrays, the average memory access time will approach the access time of the cache. Although the cache is only a small fraction of the size of main memory, a large fraction of memory requests will be found in the fast cache memory because of the locality of reference property of programs.

The basic operation of the cache is as follows. When the CPU needs to access memory, the cache is examined. If the word is found in the cache, it is read from the fast memory. If the word addressed by the CPU is not found in the cache, the main memory is accessed to read the word. A block of words containing the one just accessed is then transferred (prefetched) from main memory to cache memory. In this manner, some data is transferred to cache so that future references to memory find the required words in the fast cache memory.

The average memory access time of the computer system can be improved considerably by use of a cache. The performance of cache memory is frequently measured in terms of a quantity called "hit ratio." When the CPU refers to memory and finds the word in cache, it is said to produce a "hit." If the word is not found in cache, then it is in main memory and it counts as a "miss." If the hit ratio is high enough so that most of the time the CPU accesses the cache instead of main memory, the average access time is closer to the access time of the fast cache memory. For example, a computer with cache access time of 10 ns, a main memory access time of 300 ns, and a hit ratio of 0.9 produces an average access time of 39 ns. This is a considerable improvement over a similar computer without a cache memory, whose access time is 300 ns.

In modern microprocessors, the processor cycle time continues to improve with technology evolution. Also, design techniques of speculative execution, deeper pipelines, more execution elements and the like continue to improve the performance of the microprocessor. The improved performance puts a heavier burden on the memory interface since the processors demand more data and instructions from memory to feed the microprocessor. Large on-chip caches (L1 or primary caches) are implemented to help reduce the memory latency, and they are often augmented by larger off-chip caches (L2 or secondary caches or even L3 caches).

Prefetching techniques are often implemented to try to supply memory data to the L1 cache ahead of time to reduce latency. Ideally, a program would prefetch data and instructions far enough in advance that a copy of the memory data would always be in the L1 cache when it was needed by the processor.

One of the problems with existing prefetching mechanisms is that they operate on one cache level or one prefetch buffer. With ever increasing memory latencies associated with increasing processor speeds, a prefetch mechanism that operates on multiple cache levels is required. Therefore, what is need in the art is an improved prefetch mechanism, which alleviates such problems.

SUMMARY OF THE INVENTION

The present invention addresses the foregoing need by providing a centralized hardware prefetch mechanism, which treats the L1, L2, and L3 cache levels as a three-level prefetch buffer, appropriately compensating for the different latencies and block sizes of each cache level. A private prefetching bus is used to carry extra prefetch requests made to the L2 (secondary) cache. The result is that prefetching for the lower memory hierarchy within a multilevel cache system is performed without burdening the data busses with such prefetch traffic.

More specifically, the present invention is implemented in a multiprocessor environment whereby two processor cores share an L2 cache. Each processor core implements a prefetcher mechanism for controlling prefetching of data into the first (L1), second (L2), or third level (L3) caches. Prefetching to the second and third level caches is performed by signaling the second level cache over a private (dedicated) prefetch bus. Such prefetch signaling does not increase the traffic on the fetch busses between the first level cache and the second level cache, since these requests are prefetched to the L2 and L3 cache levels, not the L1 cache. A second processor core would have its own fetch and private prefetch busses. It should be noted, however, that the present invention is not limited to implementation with two processor cores sharing a second level cache, but could be expanded to the sharing of a second level cache by any number of processor cores, including one processor core.

The present invention further appends to the prefetch request a signal for notifying the L3 cache to prefetch data to its arrays. Such a prefetch request might be for a plurality of cache lines, such as four cache lines within a block.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIGS. 3–9 depict ramping up of a multilevel cache hierarchy in accordance with an embodiment of the present invention;

DETAILED DESCRIPTION

Figure 1:
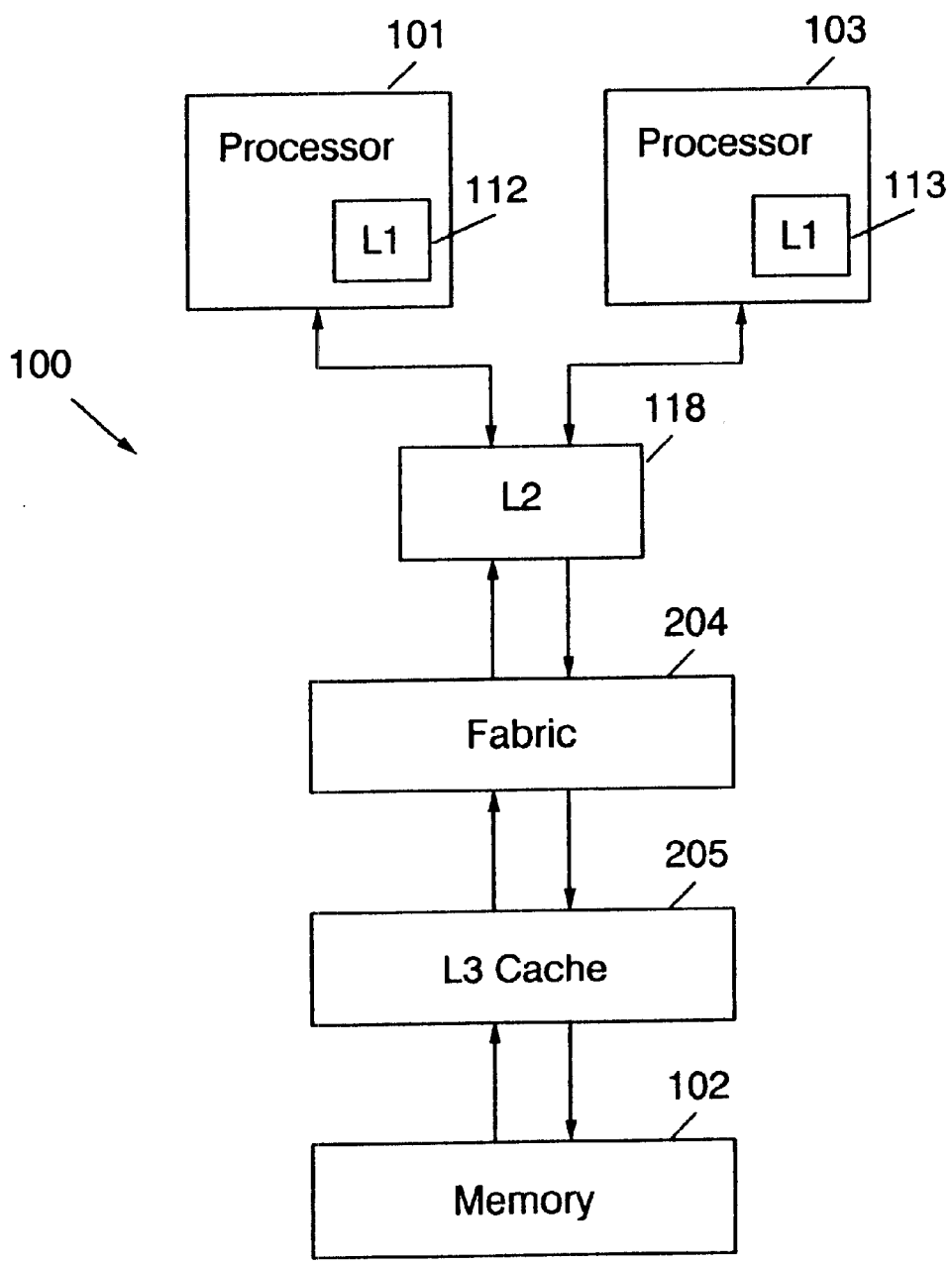
FIG. 1 illustrates a multiprocessor architecture implementing an embodiment of the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring now to FIG. 1, a data processing system which advantageously embodies the present invention will be described. Multiprocessor system 100 includes any number of processing units greater than or equal to one. In the embodiment hereinafter described, processor core 101 having embedded L1 (primary or first level) cache 112 and processor core 102 having embedded L1 cache 113 are both coupled to shared L2 (secondary or second level) cache 118. L2 cache 118 is coupled to fabric 204, which may embody a bus system for enabling other processor cores, or other types of devices typically coupled to a data processing system, which may need instructions and/or data from a central memory system, to be coupled to processor cores 101 and 102. Coupled to fabric 204 is L3 (level three) cache 205, which is then coupled to system memory 102. L3 cache 205 and memory 102 may be shared by processor cores 101 and 102 with other devices coupled to fabric 204. As a result, system 100 embodies a three-level cache system for alleviating latency problems, as described previously. L3 cache 205 and memory 102 may be partitioned.

Figure 2:
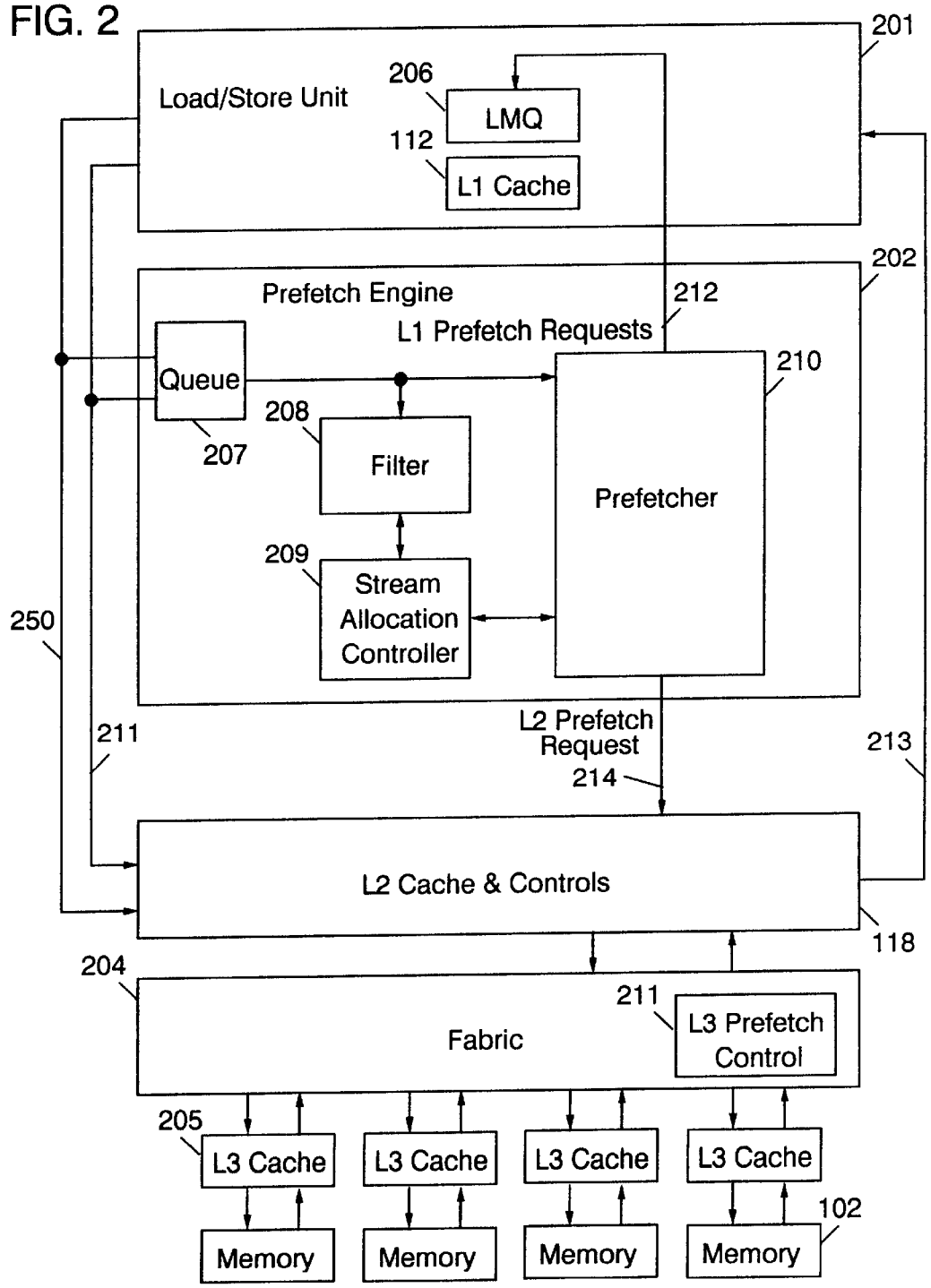
FIG. 2 illustrates further detail of the hardware prefetch mechanism of the present invention in block diagram form.

Referring next to FIG. 2, there is illustrated a block diagram detailing the hardware prefetch mechanism of the present invention. In this illustration, the hardware prefetch mechanism is only described with respect to its implementation within one of the processor cores 101, 102. Load/store unit 201 and prefetch engine 202 will be implemented in both of the processor cores 101 and 102. Load/store unit 201 includes L1 cache 112, along with a load/miss queue (LMQ) 206, which tracks misses to the L1 cache upon receiving requests from the processor core 101. A more detailed description of load/store unit 201 is found within U.S. patent application Ser. No. 09/343,434, which is hereby incorporated by reference herein. However, it should be noted that the present invention is not limited to the particular load/store unit described within this cross-referenced patent application, but may be implemented with any type of load/store unit implementing a load/miss mechanism for tracking misses to the L1 cache.

The present invention is implemented with a dual-ported L1 cache 112. Busses 210 and 211 will handle a set of hits or misses coming out of the load/store unit 201. Such hit or miss signals will be tapped off of busses 210 and 211 into queue 207, which then supplies L1 cache misses to stream filter 208, and L1 cache hit or misses to the prefetcher 210. Busses 210 and 211 are also coupled to L2 cache 118 for fetching cache lines therefrom via bus 213.

Stream filter 208 receives the cache misses and operates in a manner well known in the art. Stream filters are history buffers that contain address and direction information. The filter contains the address of a cache line that is the next sequentially higher line from one that missed previously in the L1 cache 112. If an access is made to the next higher cache line, a stream condition is detected. For example, the filter would be written with a cache line address of X+1 if there was an access and miss to cache line X. If a subsequent access is made to cache line address X+1 while X+1 is still resident in the stream filter, X+1 is then allocated as a stream. Such allocation is performed by stream allocation controller 209 in a manner well known in the art. For a further discussion of such stream filters, please refer to U.S. Pat. No. 5,664,147, which is hereby incorporated by reference herein.

The present invention does not make use of prefetch buffers, but instead prefetches cache lines into the L1 cache 112, L2 cache 118, and L3 cache 205. Stream filter 208 can allocate and keep track of a multitude of streams. It should be noted that such streams may be allocated in an increasing or decreasing manner as a function of certain rules, which are not pertinent to an understanding of the present invention. When a stream is allocated by the stream allocation controller 209, the prefetcher 210 allocates the head of the stream into the load/miss queue 206. The LMQ 206 then sources the request for the cache line at the head of the stream along busses 210 and 211 as a fetch to L2 cache 118. L2 cache 118 will then "fetch" the cache line to be prefetched into the L1 cache 112 in a well known manner from either the L2 cache 118, the L3 cache 205, or system memory 102.

The processor 101 of the present invention operates at such a high speed that it is capable of executing instructions at such a fast rate that it is important to prefetch a sufficient number of cache lines of data from system memory 102 to ensure that the data is ready and available for the processor 101. Thus, the present invention ramps the prefetch to such a rate so that an n number of cache lines are prefetched into the L1, L2 and L3 caches from system memory 102. The prefetcher 210 includes an algorithm that decides how far ahead to prefetch and how fast to ramp up the prefetching scheme. Eventually, it is desired that the system be one cache line ahead in the L1 cache 112, four cache lines ahead in the L2 cache 118, and n−5 cache lines ahead in the L3 cache 205. In the present invention, prefetching into the L3 cache is done in blocks of 512 bytes (four cache lines). One embodiment of the present invention eventually gets to the point of having either 0, 1, 2, or 3 blocks prefetched into the L3 cache 205. In the following discussion, FIGS. 3–9 illustrate that the L3 cache is capable of holding 0, 1, 2, or 3 blocks.

With the processor speed and memory latency requiring a prefetch depth of about ten lines per stream, the hardware prefetch controller needs the confirmation of the program hit on the line prefetched into the L1 in order to limit the prefetch activity to the streams actually being accessed. Otherwise, the prefetch activity could easily get in the way of the program data accesses and lower performance. This requirement leads to the centralized prefetch control at the L1 cache level. However, the requirement also means that an efficient mechanism must be found to control the prefetches into the lower cache levels (L2 and L3). This efficiency is accomplished by this invention in the following way. The prefetch requests to the L1 cache use the normal L1 miss busses 210 and 211 to source the L1 cache load requests to the L2 cache. Prefetch requests to load the L2 cache are sourced via a separate bus, the L2 prefetch request bus 214. The use of this separate bus minimizes the prefetcher impact to the L1 cache 112 operation, as the L1 miss busses 210 and 211 are busy anytime their respective data cache port is active. If either of these prefetch request types miss the L2 cache 118, the line address is sourced via the Fabric to all the caches in the multiprocessor system using the implemented cache protocols. Prefetch requests to the L3 are embedded in the prefetch to L2 commands and do not require a separate fabric command to be broadcast. On receipt of a prefetch to L2 command containing an embedded L3 block prefetch request, the L3 owning that memory block will load the L3 with the copy of that block in memory, if this block is not already in the L3. No coherency check is done on the four lines in that block at the time the L3 is loaded, in order to minimize the coherency traffic loading.

When the lines in this block are subsequently prefetched into the L2, normal fabric coherency checks are done to ensure that the line loaded is the most updated copy. In the event another cache contains a more updated copy, that cache sources the data instead of the L3. This case should be the exception, and the L2 prefetch request data will be sourced by the L3 most of the time.

In summary, in steady state operation, the L1 prefetch requests hit in the L2 and data is returned, without a fabric coherency operation being required. The L2 prefetch requests hit in the L3 (or another cache) and data is loaded to the L2 only. One fabric load request is required to check the coherency of this line in all the system caches. The L3 prefetch requests are embedded in one of every four L2 prefetch request fabric operations.

On detection of the L3 prefetch embedded command, the requested cache block is loaded from memory to the L3 cache. The additional system loading caused by prefetching is limited to the additional dedicated prefetch bus between the prefetcher and the L2 cache, and the memory to L3 interface in the unlikely event that prefetched lines are found in other caches. The critical system resource, the fabric address bus, is not impacted in any way.

The following description provides a basic prefetch start-up sequence in accordance with the present invention. The depths may vary as more modeling results are obtained. The following table, along with FIGS. 3–9 will illustrate how such a ramp-up process is implemented within the present invention.

TABLE 1

| 1 Allocation | 2 L2 State 1 | 3 L2 State 2 | 4 L3 State 7 | 5 L3 State 8 | 6 Steady State | Req Type |
|---|---|---|---|---|---|---|
| n + 1 | n + 2 | n + 3 | n + 4 | n + 5 | n + 6 | L1 |
| n + 2 | n + 3 | | | | | L2 |
| | n + 4 | | | | | L2 |
| | n + 5 | n + 6 | | | | L2 |
| | | n + 7 | n + 8 | n + 9 | n + 10 | L2 |
| | | n + (8,9, 10,11) | n + (12,13, 14,15) | Additional Req to get to +/−3 512b blocks ahead | 512b block 3 blocks ahead every fourth request | L3 |

Figure 3:
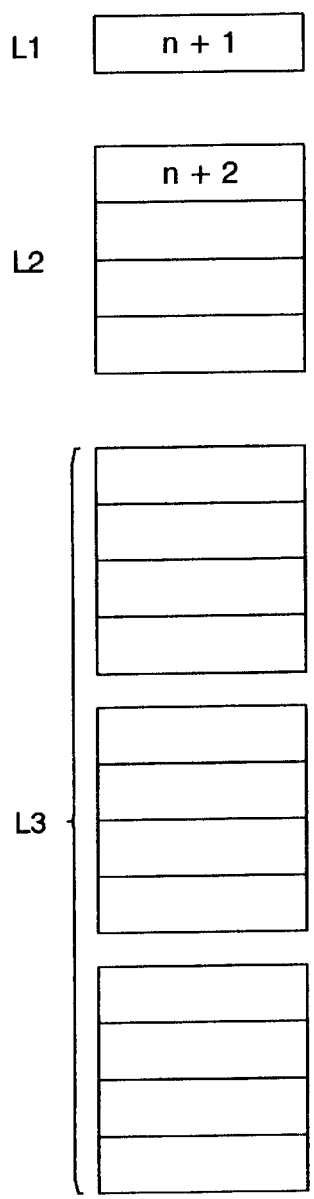
Figure 4:
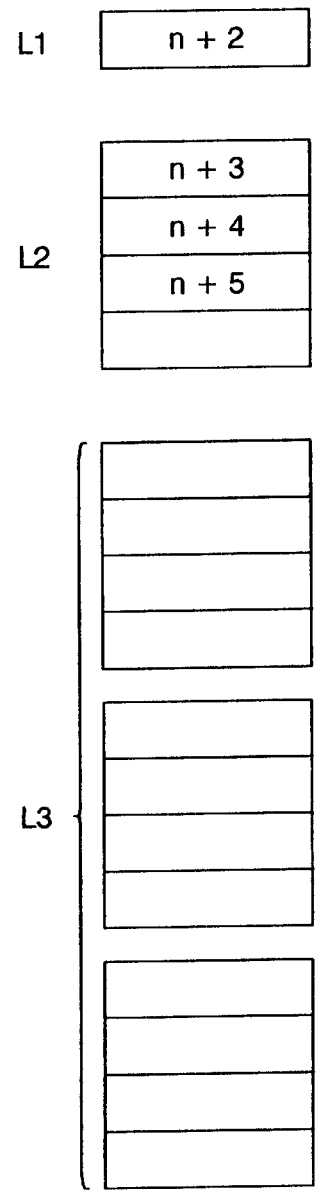
Figure 5:
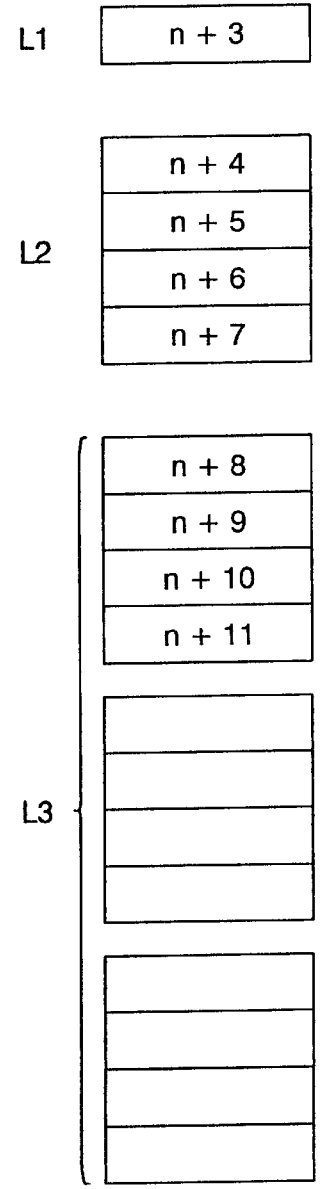

Prefetch begins by saving the real address of the L1 D-cache 112 misses in a 10-entry filter queue 208, offset up or down by one cache line address. A subsequent L1 cache 112 miss (this cache line will be referred to as "cache line n") which matches a filter entry, establishes a stream entry in the prefetch engine 202, kicking off the first prefetches, which are initially the next line (n+1) to L1 cache 112 and cache line n+2 to L2 cache 118. See column 1 in Table 1 and FIG. 3 illustrating the steady state condition of the allocation within the various caches. Another confirmation occurs when execution within the processor 101 generates a demand read of cache line n+1 from L1 cache 112. This triggers the prefetch engine 202, that is prefetcher 210, to request that cache line n+2 be prefetched from L2 cache 118 to L1 cache 112 along bus 213, and cache line n+3 be brought into L2 cache 118 along with cache lines n+4 and n+5. This steady state condition is illustrated in column 2 of Table 1 and FIG. 4.

Upon still further confirmation of the stream through a demand read of cache line n+2 by processor 101, cache line n+3 is brought into L2 cache 112, while cache lines n+6 and n+7 are prefetched into L2 cache 118. When the n+7 request is made, an L3 prefetch request is made which will bring the next adjacent 512-byte block (the +1 block) into the L3 cache 205. For purposes of this example, assume that the next 512-byte block contains cache lines n+8, n+9, n+10, and n+11. This steady state condition is shown in column 3 of Table 1 and in FIG. 5. Full prefetch depth is reached when, upon a demand read by processor 101 of cache line n+3, cache line n+4 is prefetched into the L1 cache 112, cache line n+8 is prefetched into the L2 cache 118, and cache lines n+12, n+13, n+14, and n+15 (the +2 block) are prefetched into the L3 cache 205. This is shown in column 4 of Table 1 and FIG. 6. Thereafter, if there is a demand load on cache line n+4, cache line n+5 will be prefetched into L1 cache 112, and cache line n+9 will be prefetched into L2 cache 118. Within L3 cache 205, the +1 and +2 blocks will remain, resulting in an overlap between L2 cache 118 and L3 cache 205 of cache lines n+8 and n+9. This is shown in FIG. 7. Column 5 further shows that in an alternative embodiment of the present invention, the next four cache lines, n+16, n+17, n+18, and n+19, also referred to as the +3 block, may be prefetched into the L3 cache 205. Should cache line n+5 be demand read by processor 101, cache line n+6 will be prefetched into L1 cache 112, and cache line n+10 will be prefetched into L2 cache 118. Again, L3 cache 205 will continue to contain the +1 and +2 (and possibly the +3) blocks. This is illustrated in FIG. 8 and shown in column 6 of Table 1.

FIG. 9 illustrates the possible next step within the prefetch sequence whereby there is a demand read of cache line n+6 by processor 101. In this instance, cache line n+7 is prefetched into L1 cache 112, and cache line n+11 is prefetched into L2 cache 118. Note that L3 cache 205 now contains the +2 and +3 blocks, since essentially the +1 block has been totally prefetched from L3 cache 205 into L2 cache 118. In this instance, the present invention may also prefetch the +3 block into L3 cache 205.

Another unique aspect of the present invention is accomplished when the 512-byte blocks are prefetched into the L3 cache 205. This is not accomplished by additional traffic on the data busses between the various caches and the load/store unit 201. As described above, L2 cache 118 prefetches are requested by the prefetcher 210 across the private bus 214. As further described above with respect to FIGS. 3–9 and Table 1, on every fourth L2 prefetch request for a stream, four cache lines will have been moved from the L3 cache 205 to the L2 cache 118. To maintain the same number of cache lines prefetched ahead within the L1/L2/L3 cache subsystem, a new block of data is prefetched from memory 102 into the L3 cache 205. In order to accomplish this without incurring additional address coherency traffic in fabric 204 (in other words, it is not accomplished with a separate address command, which could have been done), the L2 prefetch request on bus 214 will carry additional information for the L3 cache controller 211. The additional information carried within the L2 prefetch request can be merely some embedded bits, which the L3 prefetch controller 211 looks for for implementing its block prefetch process (see FIG. 11). This additional information (sourced from the prefetch controller 210) requests that the L3 cache controller 211 increment the L3 block address of the actual L2 cache line load by 1, 2, or 3 blocks, and then prefetch that entire block from system memory 102. No coherency checking is done on this prefetch of the block at this time. All coherency checking is done at the time the cache line is loaded into the L2 cache 118. Again, the advantage of this mechanism is that the address coherency fabric is not burdened with separate commands for the L3 block prefetches from memory 102.

To avoid latency penalties for consecutive accesses detected by the prefetcher 210, the amount of data prefetched into each cache level has been tuned in the present invention to roughly compensate for the latency of the next level of cache or memory. In addition, the prefetcher commands take into account the cache block size. And finally, the depth of prefetching is controllable to match the characteristics of the processor configurations. At the maximum amount of prefetching, one line has been prefetched into the L1 data cache 112, four lines into the L2 cache 118, and three cache blocks into the L3 cache 205. When the prefetched L1 cache line is accessed, the next line is prefetched into the L1 cache 112 and the next (+4) cache line is prefetched into the L2 cache 118. Every fourth line accessed also causes a new block of data to be prefetched into the L3 cache 205. The number of cycles required to fully use a cache line in the L1 cache 112 is generally more than the time required to load the next cache line from the L2 cache 118. The number of cycles required to fully use four cache lines is generally more than the time required to prefetch a cache line from the L3 cache 205 to the L2 cache 118 and, the number of cycles required to use ten or so cache lines is generally more than the time required to prefetch a cache line from memory 102 to L3 cache 205. Matching consumption rate to latency in this way allows a program using data streams to run as if the data were completely contained within the L1 cache 112 (presuming sufficient data bandwidths in the design).

The foregoing prefetch mechanism provides a hardware-based system for prefetching data cache lines from the memory subsystem. This includes a method for detecting patterns of cache line misses and prefetching lines in anticipation of their use. The prediction method uses the event of a cache line miss and a guess as to a direction (ascending or descending). An initial set of prefetches are sent when a second miss confirms a pattern, and when further misses reinforce a pattern, a more aggressive level of prefetching is invoked. The prefetcher 210 continues to prefetch down a stream as long as subsequent cache line requests continue to confirm the stream pattern. One of the key advantages of this hardware-based approach is that it works without any special software assistance, and that it paces the prefetches to work optimally on the hardware with its given set of memory latencies. For very long streams, this approach is satisfactory. However, because the latency to memory is very long relative to the processor cycle time, the time to begin prefetching a stream is a significant number of processor cycles (associated with the two or more cache line misses required to detect a stream).

As previously described, two cache misses start the hardware prefetch mechanism of the present invention through the use of the stream filter 208 allocating a stream. Due to the high frequencies of today's processors, this may comprise many hundreds of processor cycles. For streams that are not a large number cache lines long, this prefetch initiation time dominates the overall performance, causing the average performance to dip significantly below the steady state performance of a stream being actively prefetched.

Since the programmer often knows the characteristics of a given application algorithm, e.g., that the streams are short and the stream data is not likely to be in the cache, the application code could be enhanced with the proper mechanism to inform the hardware prefetch mechanism to immediately begin prefetching a stream before the first miss. This improves the average performance by shortening the stream start-up time, but still utilizes the prefetch hardware to track and control prefetching for the stream.

This alternative embodiment adds a software hint instruction to directly start the hardware prefetcher 210, which in a sense overrides the hardware method for detecting streams using the filter 208 and information from cache line misses. This instruction, which may be inserted into the instruction stream by the programmer, informs the hardware to aggressively start a hardware prefetch stream, providing a starting storage address and a direction to prefetch (either ascending or descending addresses). Upon execution of the instruction, the prefetcher 210 loads the starting address, initiates a startup sequence for that stream (some number of initial prefetches) and thereafter prefetches that stream upon the detection of cache line misses as per its normal operation as previously described.

An advantage of this method over a pure software touch approach is that the application need only issue one instruction to start a stream, and thereafter the hardware does the optimal pacing of prefetches for that stream.

Note that such pure software touch approaches as previously implemented within the prior art are inferior in that for each prefetch of a cache line, another touch instruction needs to be issued, which quite naturally is inefficient and burdensome upon the processor.

The approach of the present invention is simple from a software perspective, and may be implemented in compilers automatically or via pragmas or software directives. Thus, the effect on software is precise and minimal, and with the software assistance, the performance advantage of the hardware prefetching system is enhanced for short to medium length streams. Since many applications consist of a large number of short to medium streams, this alternative embodiment would increase the application performance significantly, with minimal change to application software and maximum exploitation of the hardware prefetching mechanism described above.

As an example, such short- to medium-length streams may be incurred through the use of DO loops, and the software hint instruction herein described may be put in before such a DO loop. The touch instruction of the present invention goes into the stream filter 208 and allocates a stream. The following is a description of an exemplary PowerPC instruction that may be used to start prefetching a stream:

dcbt RA, RB, TH

Figures 10, 11:
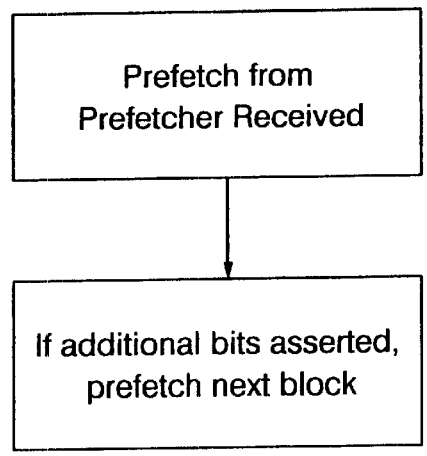
FIG. 10 illustrates an instruction used to override the hardware prefetch mechanism.
FIG. 11 illustrates a method for notifying an L3 cache to prefetch.

Referring to FIG. 10, let the effective address (EA) be the sum (RA|0 )+(RB). The dcbt instruction provides a hint that performance will probably be improved if the storage location specified by EA and the TH field are fetched into the data cache 112, because the program will probably soon load from them. The software hint is ignored for storage locations that are Caching Inhibited. If TH[1]=1, the hint is also ignored for storage locations that are guarded (a PowerPC architecture term meaning that accesses to this address space are not allowed to be speculative, and therefore cannot be prefetched). The encodings of the TH field are as follows:

| TH | DESCRIPTION |
|---|---|
| 00 | The storage location is the block containing the byte addressed by EA |
| 01 | The storage locations are the block containing the byte addressed by EA and sequentially following blocks (i.e., the blocks containing the bytes addressed by EA+nblock_size, where n=0,1,2 . . . ). |
| 10 | Reserved |
| 11 | The storage locations are the block containing the byte addressed by EA and sequentially preceding blocks (i.e., the blocks containing the bytes addressed by EA − nblock_size where n=0,1,2, . . . ). |

This instruction is treated as a load instruction, except that the system data storage error handler is not invoked, reference and change recording need not be done, and the associated data accesses may not be ordered by the sync instruction.

As an example of the ability of this alternative embodiment to immediately prefetch blocks of cache lines, refer now to the following table:

TABLE 2

| 1 Allocation | 2 Steady State | 3 Steady State | 4 Steady State | 5 Steady State | 6 Steady State | Req. Type |
|---|---|---|---|---|---|---|
| n + 1 | n + 2 | n + 3 | n + 4 | n + 5 | n + 6 | L1 |
| n + 2 | | | | | | L2 |
| n + 3 | | | | | | L2 |
| n + 4 | | | | | | L2 |
| n + 5 | n + 6 | n + 7 | n + 8 | n + 9 | n + 10 | L2 |
| n + (6,7,8,9) | 512b | | | | 512b | L3 |
| n + (10,11,12,13) | block 3 | | | | block 3 | |
| n + (14,15,16,17) | blocks ahead every fourth request | | | | blocks ahead every fourth request | |

Assume for this example, that TH=01 where three blocks are prefetched. The result is as shown in column 1 of Table 2 whereby the L1 cache 112 has cache line n+1, L2 cache 118 includes cache lines n+2, n+3, n+4, and n+5, while L3 cache 205 contains the next three blocks. Columns 2 through 6 show how the steady state condition of the L1/L2/L3 cache hierarchy contents change as there are demand fetches from processor 101 for the n+1, etc. cache lines as they move up within the cache line hierarchy.

The following is a source code example of using the software touch instruction to kick off a hardware prefetch. In the following example, there are three streams, x, y and z.

do j=1,n
  do i=1,m
    x(i,j)=x(i,j)+y(i,j)+z(i,j)
  end do
end do

These streams do not get prefetched until the initial misses are incurred to prime the prefetch engines. With the proper compiler support, the following directives (C$dir prefetch) would get translated by the compiler into the data block touch instructions, thus kicking off the prefetch streams:

C $dir prefetch(x(1,1),x(m,1))
C$dir prefetch(y(1,1),y(m,1))
C$dir prefetch (z(1,1),z(m,1))
doj=1,n
C$dir prefetch(x(1,j+1),x(m,j+1))
C$dir prefetch(y(1,j+1),y(m,j+1))
C$dir prefetch (z(1,j+1),z(m,j+1))
do i=1,m
x(i,j)=x(i,j)+y(i,j)+z(i,j)

end do end do

The prefetch gives the first and last data value needed, so the compiler can form the dcbt instruction with the starting address and direction. Note that inside the j-loop, the streams for the next iteration of the loop (j+1) are issued so that the startup time is overlapped with the current iteration of the loop.

Although the present invention and its advantages have been described in detail, it should be understood that various changes, substitutions and alterations can be made herein without departing from the spirit and scope of the invention as defined by the appended claims.

What is claimed is:

1. A method for prefetching comprising the steps of:
   sending a prefetch request to a second level cache, wherein the prefetch request includes a signal for notifying a third level cache coupled to the second level cache that the third level cache should prefetch also;
   prefetching data into the second level cache in response to the prefetch request; and
   prefetching data into the third level cache in response to the prefetch request.

2. The method as recited in claim 1, wherein the prefetch request originates from a prefetcher over a private prefetch request line that is separate from a data bus transmitting data to the second and third level caches.

3. The method as recited in claim 2, wherein the data prefetched into the third level cache comprises blocks of N cache lines, where N is greater than one.

4. A data processing system comprising:
   a processor including a load/store unit having an L1 cache;
   a prefetch engine for monitoring load misses in the load/store unit;
   an L2 cache;
   an L3 cache;
   a bus system for transferring data between the L1 cache, L2 cache, and L3 cache and the load misses from the L1 cache to the prefetch engine; and
   a private prefetch request bus for transmitting a prefetch request from the prefetch engine to the L2 and L3 caches, wherein the private prefetch request bus is separate from the bus system, wherein the prefetch request includes a signal for notifying the L3 cache that the L3 cache should prefetch.

5. The system as recited in claim 4, wherein the prefetch engine sends the prefetch request from the prefetch engine to the L2 cache over the private prefetch request bus, wherein the system further comprises:
   circuitry for prefetching cache line n+1 into the L1 cache in response to the prefetch request over the bus system.

6. The system as recited in claim 4, further comprising: circuitry for prefetching cache line n+2 into the L2 cache in response to the prefetch request.

7. The system as recited in claim 4, further comprising:
   circuitry for prefetching cache line n+5 into the L2 cache in response to the prefetch request; and
   circuitry for prefetching a first block of N cache lines into the L3 cache in response to the prefetch request, where N is greater than 1.

8. The system as recited in claim 7, wherein cache line n+5 is prefetched into the L2 cache from the L3 cache.

9. The system as recited in claim 8, wherein cache line n+1 is prefetched into the L1 cache from the L2 cache.

10. The system as recited in claim 9, further comprising:
    circuitry for receiving a demand for cache line n+1;
    circuitry for sending a second prefetch request from the prefetch engine over the private prefetch request bus to the L2 cache and the L3 cache;
    circuitry for prefetching cache line n+2 from the L2 cache into the L1 cache;
    circuitry for prefetching cache line n+6 from the L3 cache into the L2 cache in response to the second prefetch request; and
    circuitry for prefetching a second block of N cache lines into the L3 cache in response to the second prefetch request.

11. A multiprocessor system comprising:
    a first processor including a first L1 cache and a first prefetch engine;
    a second processor including a second L1 cache and a second prefetch engine;
    an L2 cache shared by the first and second processors;
    a fabric coupled to the L2 cache and adaptable for coupling to a third processor;
    an L3 cache;
    system memory coupled to the L3 cache;
    a first bus system for transferring data between the first L1 cache, L2 cache, and L3 cache and load misses from the first L1 cache to the first prefetch engine;
    a second bus system for transferring data between the second L1 cache, L2 cache, and L3 cache and load misses from the second L1 cache to the second prefetch engine;
    a first private prefetch request bus for transmitting prefetch requests from the first prefetch engine to the L2 and L3 caches, wherein the first private prefetch request bus is separate from the first bus system; and
    a second private prefetch request bus for transmitting prefetch requests from the second prefetch engine to the L2 and L3 caches, wherein the second private prefetch request bus is separate from the second bus system, wherein the prefetch requests include a signal for notifying the L3 cache that the L3 cache should prefetch.

12. The system as recited in claim 11, wherein both the first and second prefetch engines further comprise:
    circuitry for sending a prefetch request from the prefetch engine to the L2 cache over the private prefetch request bus; and
    circuitry for prefetching cache line n+1 into the L1 cache in response to the prefetch request over the bus system.

13. The system as recited in claim 11, wherein both the first and second prefetch engines further comprise:
    circuitry for prefetching cache line n+2 into the L2 cache in response to the prefetch request.

14. The system as recited in claim 11, wherein both the first and second prefetch engines further comprise:
    circuitry for prefetching a block of N cache lines into the L3 cache in response to the prefetch request and the signal, where N is greater than 1.

15. The system as recited in claim 11, wherein both the first and second prefetch engines further comprise:
    circuitry for prefetching cache line n+5 into the L2 cache in response to the prefetch request; and circuitry for prefetching a first block of N cache lines into the L3 cache in response to the prefetch request and the signal, where N is greater than 1.

16. The system as recited in claim 15, wherein cache line n+5 is prefetched into the L2 cache from the L3 cache.

17. The system as recited in claim 16, wherein cache line n+1 is prefetched into the L1 cache from the L2 cache.

18. The system as recited in claim 17, further comprising:

circuitry for receiving a demand for cache line n+1;

circuitry for prefetching cache line n+2 from the L2 cache into the L1 cache;

circuitry for prefetching cache line n+6 from the L3 cache into the L2 cache; and circuitry for prefetching a second block of N cache lines into the L3 cache.

\* \* \* \* \*